Sept. 3, 1929. J. A. STUMPENHORST 1,727,118
POWER TRANSMITTING DEVICE FOR MOTOR VEHICLES
Filed March 24, 1924 2 Sheets-Sheet 1
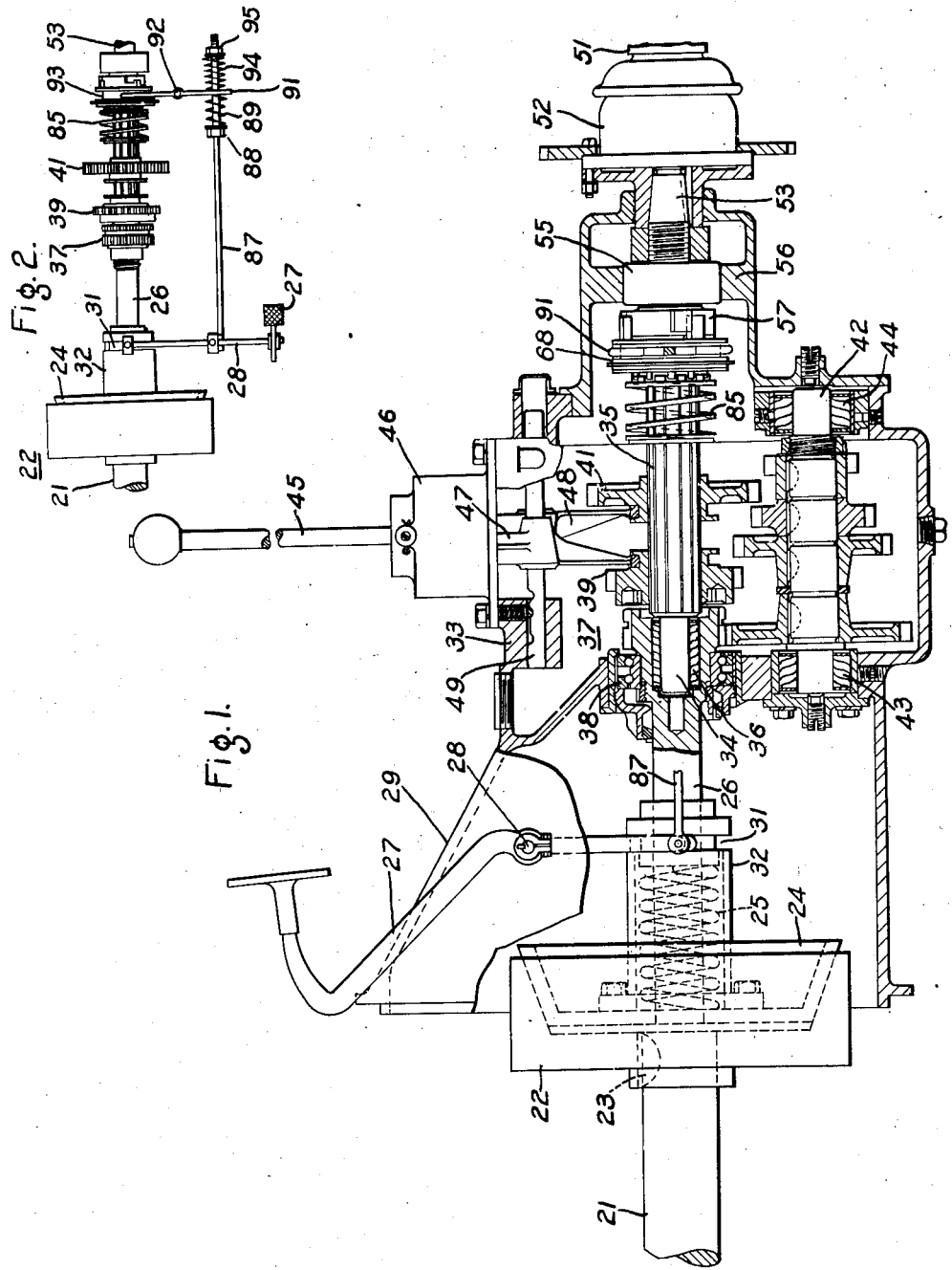
WITNESSES:
A. L. Jeffrey
R. J. Butler.
INVENTOR
John A. Stumpenhorst.
BY
ATTORNEY

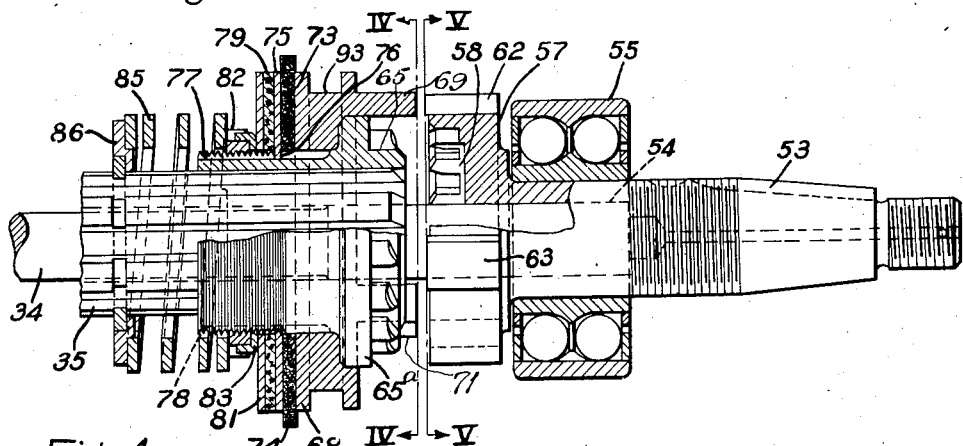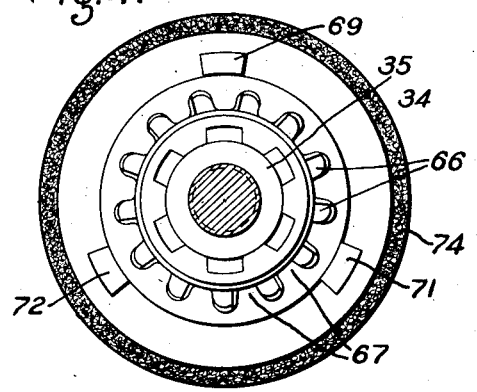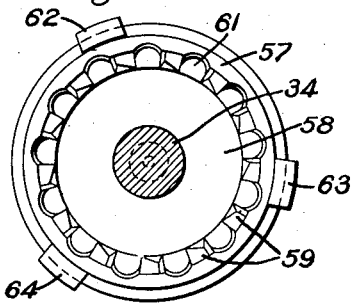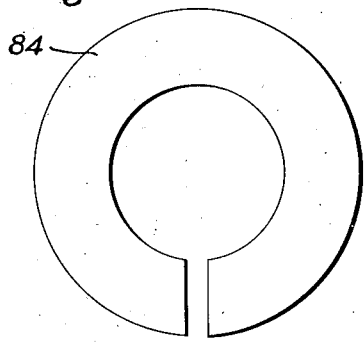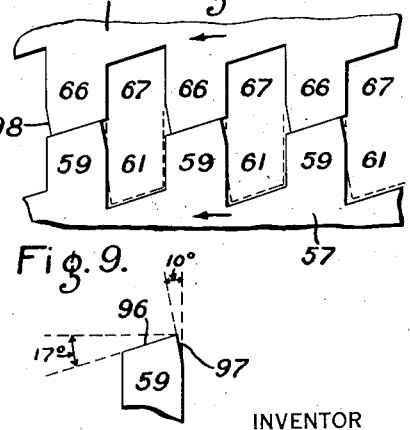

Patented Sept. 3, 1929.

1,727,118

UNITED STATES PATENT OFFICE.

JOHN A. STUMPENHORST, OF WILKINSBURG, PENNSYLVANIA, ASSIGNOR TO DUPLEX TRANSMISSION COMPANY, A CORPORATION OF DELAWARE.

POWER-TRANSMITTING DEVICE FOR MOTOR VEHICLES.

Application filed March 24, 1924, Serial No. 701,334, and in Canada April 26, 1923.

My invention relates to motor vehicles and particularly to power transmitting devices for such vehicles.

The object of my invention is to provide a relatively simple and compact auxiliary-clutch mechanism, located between the change speed gearing and the driven means that shall embody positive-engagement, friction-actuated, speed-equalizing means.

In practicing my invention I provide a two-part multiple-jaw clutch operatively connecting the change-speed gearing and the driven part of a motor vehicle. One of the two parts of the clutch is provided with one or more lugs secured thereto and projecting longitudinally therefrom beyond the outer faces of the jaws. The other part of the clutch is provided with one or more co-operating lugs rotatably mounted thereon and frictionally associated therewith, and also projecting longitudinally beyond the outer faces of the jaws. When the auxiliary clutch has been disengaged by a pedal-actuated two-part resilient means during the operation of the motor vehicle, more particularly when it is desired to change the gearing, a resilient means causes the projecting lugs on the respective clutch parts to operatively engage each other, thereby initiating the action of the friction-driven means to effect an equalization of the rotative speeds of the two parts of the clutch and then effects a full re-engagement of the co-operating multiple jaws of the clutch.

In the drawings,

Figure 1 is a view, partially in vertical longitudinal section and partially in side elevation, of a driving mechanism of a motor vehicle in which is incorporated a device embodying my invention.

Fig. 2 is a top plan view of certain portions of a power transmitting mechanism of a motor vehicle comprising the device embodying my invention, Fig. 3 is a view, in vertical longitudinal section, of a device embodying my invention, certain portions thereof being shown in side elevation, Fig. 4 is a view, in vertical lateral section thereof, taken on the line IV—IV of Fig. 3, Fig. 5 is a view, in vertical lateral section thereof, taken on the line V—V of Fig. 3, Fig. 6 is a view, in front elevation, of a resilient member comprising a part of the device embodying my invention, Fig. 7 is a view, in side elevation thereof, Fig. 8 is a fragmentary developed top plan view of a portion of a clutch part, and, Fig. 9 is a top plan view of a single clutch jaw.

A driving shaft 21 is illustrated more particularly in Figs. 1 and 2 of the drawing as being integral with or suitably connected to an engine (not shown) of an ordinary motor vehicle. As such connection to an engine and the engine itself form no part of my invention and are well known, I have not thought it necessary to illustrate them.

The shaft 21 is connected to one part or member 22 of a suitable cone clutch that is mounted on the shaft 21 and prevented from turning relatively thereto by a key 23. A co-operating clutch member 24 interfits with the cone clutch member 22, being resiliently pressed into close operative engagement therewith by a spring 25 that is mounted on a shaft 26. Means for causing disengagement of the member 24 from the member 22 comprises a foot or pedal lever 27 that is suitably pivotally mounted on a pin or short shaft 28 which is, in turn, mounted on a part of a main clutch housing 29.

The lower part of the lever 27 is forked and has its ends located in a peripheral groove 31 provided adjacent to one end of a member 32 that is of substantially tubular form, enclosing the spring 25 and having its other end secured to the clutch part 24 and effective to compress the spring 25 and move the member 24 away from the member 22 when the operator presses the upper part of the lever 27 in a forwardly direction. While I have illustrated and described a particular embodiment of main clutch and of actuating means therefor, I do not desire to be limited thereto as any type of main clutch and of pedal-lever actuating means therefor may be employed.

A change-speed gearing is located in a gear box 33 and comprises a short shaft 34 upon which is rotatably mounted a spline shaft 35. The forward end of the shaft 34 is located within a suitable roller bearing member 36 that is located within a chamber in the enlarged outer end of the shaft 26, designated generally by the numeral 37. The portion 37 is rotatably mounted within a suitable bearing member 38 supported by the front wall of the gear box 33. A pair of gear wheels 39 and 41 are mounted upon the splined shaft 35. The particular construction of the shaft 34 and of the splined shaft 35 mounted thereon are more particularly disclosed and claimed in my Patent No. 1,451,851.

A counter-shaft 42 located in the lower part of the gear box 33 in suitable bearing members 43 and 44, has mounted thereon the usual plurality of gear wheels of different diameters that are adapted to selectively engage the shiftable gear wheels 39 and 41 on the splined shaft 35 to effect changes in speed of the vehicle as is usual in such devices. Means for shifting the gears comprises a gear shift lever 45 that is pivotally mounted in an extension 46 located at the top of the casing 33 and that is shiftable laterally to engage shifting members 47 or 48 respectively that are mounted on suitable shifting bars, only one of which numbered 49, is illustrated in Fig. 1 of the drawing. The usual reverse shaft and gear wheel (not shown) are provided. It is not believed necessary to further describe the construction and operation of the change-speed gearing as the particular embodiment illustrated and described is illustrative only, and any similar type of construction may be successfully employed.

The rear wheels of the motor vehicle actuated by the hereinbefore described parts are caused to turn by a driven shaft 51, only a short portion of which is illustrated in Fig. 1 of the drawing, the inner end thereof being connected to a suitable universal joint 52 that is connected to the outer end of a suitable driven shaft 53. The inner end of the shaft 53 is provided with an axial opening 54, (see Fig. 3) into which the outer end of the round shaft 34 is tightly secured as disclosed in my hereinbefore mentioned patent. The inner end of the shaft 53 is located in and supported by a suitable ball thrust-bearing member 55 which is, in turn, located in a casing portion 56 that may be an integral portion of the casing 33 at the rear end thereof.

The inner end of the shaft 53 is provided with an enlarged portion 57 that is of substantially circular form in lateral section as is illustrated more particularly in Fig. 5 of the drawings. The member 57 is provided with a substantially circular chamber or depression 58 in its face. A plurality of jaws or teeth 59 are provided in the member 57 immediately adjacent to the depression 58 and are spaced apart by alternate spaces 61. I prefer to employ a relatively large number of longitudinally extending jaws 59, each of relatively small size, and the substantially circular form of the outer wall of the spaces 61, (see Fig. 5) is made necessary by the manufacturing requirements of such small clutch jaw members.

Upon the outer periphery of the member 57 are provided a plurality of spaced, longitudinally-extending lugs 62, 63, and 64 respectively. These lugs are spaced substantially equi-distantly around the periphery of the member 57 and extend axially a short distance beyond the faces of the jaws 59. While I have illustrated three lugs integral with the member 57, I may employ any other desired number, such as one or two, the main consideration being that these lugs be relatively narrow and that they occupy but little space circumferentially of the member 57. I have found it best to make the faces of the lugs flat and at right angles to the axis of the shaft 53. The member 57 with the jaws 59 and the projecting lugs as hereinbefore described, constitute one part of a multiple-jaw clutch.

A member 65, of substantially tubular shape and having an annular flange portion 65$^a$, is located upon the splined shaft 35 to rotate therewith but to have movement longitudinally thereof and constitutes the second part of a multiple-jaw clutch. The outer end of the member 65 is provided with a plurality of jaws 66 that are adapted to cooperate with the jaws 59 of the member 57 and to fit within the spaces 61 thereof with a small amount of clearance circumferentially thereof. The teeth or jaws 66 are separated by spaces 67 into which the teeth 59 are adapted to fit when the two parts of the clutch are in close operative engagement. This construction provides a positive-action clutch combining relatively great strength with light weight and relatively small dimensions.

A member 68, of substantially cup-shape, is rotatably mounted on the member 65 fitting against the enlarged portion 65$^a$ thereof as is illustrated more particularly in Fig. 3 of the drawings. At its outer end the member 68 is provided with a plurality of spaced and longitudinally-extending lugs 69, 71 and 72 that project a short distance beyond the face of the jaws 66 of the member 65. As will be hereinafter described in detail the lugs 69, 71 and 72 are adapted to operatively engage and interfit with the lugs 62, 63, and 64 of the member 57.

The member 68 is provided with an inner flat annular surface 73 that is operatively engaged by one side of a friction ring 74 that is of substantially thin, annular form, and may comprise asbestos material so as to be non-burning. A steel washer 75 operatively engages the outer face of the friction ring 74 and is prevented from turning relatively to the member 65, upon which it is mounted, by having a plurality of inwardly extending lugs or projecting portions 76 that fit into slots 77 and 78 provided in the surface of the reduced portion of the member 65 and extending longitudinally thereof. A resilient member 79 comprises a cork washer that is pressed against the outer face of the member 75 by a second steel washer 81. The washer 81 is pressed against the member 79 by means of an adjustable lock nut 82 that has screw-threaded engagement with the rear screw-threaded portion of the member 65 as is illustrated in Fig. 3 of the drawing. The member 82 is held in any desired position on the screw-threaded reduced portion of the member 65 by a lock washer 83, that is provided with a plurality of outwardly-extending, spaced tongue portions, one or more of which may be bent over into lateral grooves in the outer surface of the member 82 as is illustrated in Fig. 3 of the drawings, and that is also provided with inwardly extending lugs fitting into the slots 77 and 78 to prevent turning movement thereof relatively to the member 65.

Instead of the cork washer 79 hereinbefore described, I may employ a corrugated metal member 84, of substantially annular form, as illustrated in Figs. 6 and 7. The corrugated form of the washer permits of obtaining a spring action when it is mounted between the steel washers 75 and 81 respectively. It may be here noted that the steel washer 75 in actual engagement with the non-burning friction member 74, and the members 79, 81, 82 and 83 are caused to rotate with the member 65, while the members 68 and 74 may have a turning or a rotative movement relatively thereto.

Resilient means for yieldingly holding the member 65 and the other members hereinbefore described as being mounted thereon in their proper operative positions relatively to the member 57 comprise a helical spring 85, the inner end of which may rest against a spring ring 86 mounted on the splined shaft 35 at a suitable point thereon. The other end of the spring 85 rests against a suitable portion of either the member 65 or the part mounted thereon and is here shown as abutting against the inner face of the lock nut 82.

Means for causing disengagement of the part 65 of the multiple-jaw auxiliary clutch hereinbefore described from the part 57, comprise a link member 87, (see Fig. 2) that has one end thereof pivotally mounted on the lower forked end of the pedal lever 27 and that has its other end extending into the gear box 33. The rear end of the rod 87 is provided with screw threads and has mounted thereon an adjustable nut 88 against which there abuts one end of a relatively short and heavy helical spring 89. The other end of the spring 89 is in operative engagement with one side of the outer end of a lever 91 that is pivotally mounted on a suitable pivot pin 92. The inner forked end of the lever 91 is located in a circumferential groove 93 of the member of cup shape 68. A relatively long and light spring 94 has one end in operative engagement with the other side of the lever 91 and is held thereagainst by an adjustable nut 95 located adjacent to the end of the rod 87.

As is well known, it is not particularly difficult to change the internal connections of the gears in a motor vehicle when going from low to intermediate or second, and from second to high speed. It is much more difficult, however, to change from high gear to intermediate and very difficult to change to low gear or speed, particularly so in change-speed gearing of the type employed at present in motor vehicles, when the vehicle is moving at any relatively high rate of speed. This is for the reason that certain of the gear wheels in the gear box constituting a part of the change-speed gearing, are permanently connected to the driving wheels of the vehicle, and are therefore forced to rotate at a speed that is in accordance with the speed of travel of the vehicle. If a gear wheel which is to mesh with such a given gear wheel is rotating at a very different speed, which speed is usually much lower, it is apparent that it is not easy to cause them to mesh. Under extreme conditions, where the operator has attempted to force gear wheels into mesh, the result has been to break gear teeth either partially or totally, or to strip the gear wheel entirely of teeth.

When the operator desires to shift from high gear to intermediate or second gear, with the aid of the device hereinbefore described and embodying my invention, he moves the foot lever 27 forwardly to cause disengagement of the main clutch located between the driving shaft and the change-speed gearing, and, substantially simultaneously therewith, to cause disengagement of the auxiliary multiple-jaw clutch parts 57 and 65 through the action of the link member 87 and the lever 91. During this disengaging operation of the auxiliary clutch the relatively short heavy spring member 89 hereinbefore described is effective and acts as a cushion between the actuating movement of the rod 87 and the actual disengaging means constituted by the lever 91.

It is evident that the gear wheels 39 and 41 together with the splined shaft 35, the part 65 of the multiple-jaw clutch and the other parts located thereon, are entirely disconnected from the driven part of the motor vehicle, the final inoperative position of the auxiliary multiple-jaw clutch being that illustrated in Fig. 3 of the drawings. The mass of these parts is, of course, relatively small, and, instead of acting as substantially fixed members to which the other gear wheels must accommodate themselves in order to mesh therewith as would be the case if they were fixedly connected with the driven shaft 51, they are what might be termed flexible or resilient and may move slightly circumferentially either forwardly or backwardly in order to permit of meshing with a co-operating gear wheel. It is evident therefore that the new connection of co-operating gear wheels may be easily and quickly established.

In the above described change of gearing from high speed to second speed the member 57 of the auxiliary clutch will rotate at a predetermined speed which will be faster than that of the member 65 of the clutch after the change has been made in the gearing. In my Patent No. 1,396,074 I have disclosed and claimed a relatively simple form of multiple-jaw clutch, the faces of the jaws being beveled in a predetermined direction. The direction of this bevel is illustrated in Figs. 8 and 9 of the present drawings and I have indicated a particular angle of bevel on the face 96 of a jaw 59 as 17°. The angle of bevel on the face of the jaws 66 of the other part of the clutch is substantially the same. This direction of bevel is such that when the member 57, as illustrated in Fig. 8 of the drawing, is turning in the direction indicated by the arrow and at a higher rate of speed than the part 65 thereof (which is rotating in the same direction) there is little or no direct tendency for the two parts to mesh, as is more particularly disclosed and claimed in the above mentioned patent.

When the operator has effected the desired change in the gearing by the gear shift lever 45, he permits the pedal lever 27 to move backwardly to substantially the position illustrated in Fig. 1 of the drawings. This effects a forward movement of the rod 87 and permits a movement of the pivotally mounted lever 91 under the action of the relatively heavy spring 85 as well as of the relatively light spring 94 on the rod 87. The lugs 62, 63, and 64 will mesh with the projecting lugs 69, 71, and 72 when the member 65 of the auxiliary clutch has been moved a sufficient distance rearwardly on the splined shaft 35 to cause the two sets of lugs to interfit.

As the rear part 57 of the auxiliary clutch is directly connected to and actuated by the rear wheels of the moving vehicle, the projecting lugs 62, 63, and 64 operatively engaging the lugs 69, 71, and 72 of the second part of the auxiliary clutch constitute a positive-engagement means that is adapted to cause rotation of the member of cup-shape 68 that is loosely mounted on the member 65 and will cause it to rotate at the same speed. The rotative speed of the member 68 is transmitted, through the friction member 74 to the steel washer 75 and through the projecting lugs 76 thereof to the member 65 and, of course, simultaneously to the splined shaft 35 and to the gear wheels located thereon. The adjustment of the lock nut 82 against the resilient member 79 may be so adjusted that this friction-driven part of the auxiliary clutch will effect an increase of the speed of the member 65 until it rotates at substantially the same speed as does the part 57 of the clutch.

The above described operation is substantially completed in a very short period of time that may be measured in fractions of a second, and occurs during the time that the front part 65 of the auxiliary clutch is moving toward the rear part thereof as permitted by the rearward movement of the foot lever 27 by the operator and under the influence of the spring 85. If it should happen that the jaws 66 of the part 65 are momentarily located opposite to or in alinement with the spaces 61 at the time that the jaws of the two parts just interfit the re-engagement of the two parts of the auxiliary clutch will be immediately completed.

In order to aid in the re-engagement of the two parts, I provide a relatively small and short bevel 97 (see Fig. 9) that is located at the trailing side of the jaws 59, and I provide similar beveled sides 98 at the leading side of the jaws 66. This provides a larger opening between the opposing sides of adjacent jaws in each of the clutch parts that will permit the jaw tips of the other clutch part to enter more easily. I have shown this angle in Fig. 9 of the drawings as being substantially 10°, the bevel extending longitudinally for about one third of the axial length of the high side of each jaw. As will be hereinafter set forth this angle may be varied in accordance with other details of construction of the device.

The hereinbefore described meshing or re-engagement of the two parts of the auxiliary clutch will, in all probability, not be effected the first time. The opposing beveled faces of the jaws 59 and 66 will more probably meet in more or less complete abutting relation, substantially as illustrated in Fig. 8 of the drawings. When this occurs at a time at which the rotative speeds of the two parts are different, the member 57 rotating, as has hereinbefore been explained, at a higher rate of speed, the auxiliary clutch operates as an over-running clutch, by reason of the beveled faces of the co-operating jaws.

It is obvious that if the part 65 is resiliently pressed against the part 57 and the beveled jaw surfaces operatively engage each other, there will be a rebound of the member 65 away from the member 57. The extent of the rebound is dependent upon the angle of bevel of the faces 96, the strength of the spring 85, the friction of the member 65 on the splined shaft 35, the mass of the member 65 and of the parts mounted thereon, and the relative rotative speeds of the two clutch parts. It is further apparent that the angle of bevel of the faces of the jaws 59 and 66 is of great importance, particularly in determining when the two clutch parts will again meet under the influence of the spring 85. It is possible to select the angle of the faces of the jaws with reference to the other factors above enumerated so that in substantially all cases of operation the rebound is relatively small and that the return of the member 65 by the spring 85 after one or possibly two rebounds, is to such a position as to permit a full re-engagement, that is, the jaws of one member fit into the corresponding spaces in the other clutch member.

It is evident that the rebound is a maximum when the bevel of the face of the jaw is zero. The rebound decreases as the bevel of the faces of the jaws increases, while the tendency of the rotating clutch part to drag the other part along increases as the angle of bevel of the faces of the jaws increases. I have found by experiment that the range of value of the angle of bevel of the faces is from ten to twenty-five degrees, depending upon the other factors hereinbefore mentioned. For any given design there is, therefore, an "optimum" angle of bevel of the jaw faces, depending upon part or all of the factors hereinbefore enumerated, which will effect or permit the quickest remeshing of the two parts of the auxiliary clutch. I have determined by actual experiment and construction that by proper co-ordination of all of the factors entering into the design, the re-engagement of the auxiliary clutch can be effected in very little more time than is required to permit the pedal-lever 27 to return to its normal position after having been moved to its forward position to permit the operator to change gears.

The angle of bevel of the side 98 of the respective jaws may also be varied, and I have found that this variation may be from five to fifteen degrees. I prefer to have this angle of bevel relatively small as I find it possible to rely upon the beveled faces in co-operation with the other resilient parts of the device to effect very quick re-engagement. In this connection the relatively light and long spring 94 on the rod 87 is effective to permit the hereinbefore described over-running action of the two parts of the auxiliary clutch, which over-running action will cause the part 65 to rebound several times. If it is assumed that the operator has permitted the foot lever 27 to move back to its normal position, any rebounding action of the part 65 effects a corresponding movement of the lever 91, the outer end of which is then more particularly under the influence of the light spring 94. As the groove 93 must of necessity be made slightly larger in width than the width of the forked ends of the lever 91, this construction provides some lost motion which is also of value in permitting the hereinbefore described rebounding action, which action is damped first by the above mentioned lost motion between the rod 91 and the walls of the groove 93, and finally by the action of the spring 94.

If the operator wishes to change from second speed to low speed or directly from high speed to low speed, substantially the same conditions of relative rotative speeds of the two auxiliary clutch parts exist, except that the front part of the auxiliary clutch rotates at a much slower speed. The action of the auxiliary clutch is, however, substantially the same.

If the auxiliary clutch is disengaged by the operator when changing from low gear to second or from second to high, the rear part of the clutch will rotate at a slower speed than the front part of the clutch. The angle of bevel of the jaw faces will then assist the front part of the auxiliary clutch to re-engage the rear part of the clutch. This is evident from an inspection of Fig. 8 of the drawing, from which it will be seen that when the part 65 rotates faster than the part 57, the jaws will remesh when the part 65 is pressed toward the part 57 by the spring 85.

When it is desired to change from low speed into reverse, the rear part 57 of the clutch rotates in the direction indicated by the arrow, while the front part 65 of the clutch rotates in the opposite direction as soon as the gearing has been changed into reverse. This condition is, therefore, substantially the same as that hereinbefore described where the rotative speed of the part 57 is greater than that of the part 65. Full re-engagement is therefore effected substantially as hereinbefore described.

When changing the gearing from reverse to low speed, the rear part of the auxiliary clutch is rotating in a direction opposite to that indicated by the arrow, while the front part rotates in the direction indicated by the arrow after the change has been made in the change speed gearing itself.

It is to be particularly noted that while the rear part of the auxiliary clutch is normally the driven part (during the operation of the motor vehicle), it momentarily becomes the driving part during the time that the main clutch is disengaged and, (after the change speed gearing has been shifted), during the time of effecting re-engagement of the auxiliary clutch. The conditions under which a device of the type embodied in my invention must operate successfully are, therefore, much more complicated than in the usual power transmitting device wherein one member of a clutch is always the driven part and the other member is always the driving part.

The multiple-jaw auxiliary clutch hereinbefore described as being located between a change-speed gearing and the driven shaft of a motor vehicle provides, in effect, an over-running clutch of the positive type that is provided with a positive engagement, friction-actuated, speed-equalizing means mounted thereon. When re-engagement of the clutch is being effected, the positive-engagement means associated with the clutch initiates the action of the friction-driven speed-equalizing means. The angle of bevel of the faces of the jaws is made inversely in accordance with the mass of the clutch and also inversely in accordance with the strength of the spring that is effective to cause full re-engagement of the clutch parts, this being in accordance with the principles hereinbefore detailed. This permits the device embodying my invention to be applied to any size and type of change speed gearing usually employed on motor vehicles and effect proper operation thereof.

I am aware that it has been heretofore suggested to employ cone or disc clutches to connect the change-speed gearing to the driven shaft of a motor vehicle. By employing an auxiliary clutch that is of the positive-engagement type I am enabled to make it relatively small in dimensions, thereby permitting of mounting it in a relatively small integral extension of the present gear box containing such change-speed gearing.

The device embodying my invention may be embodied in a change-speed gearing of any one of the present standard types of construction, and the operator need not vary his usual method of shifting the gears. In fact, he will be able to shift gears, particularly from high speed to second or from second to low, at much higher speeds of the motor vehicle than is possible with the present devices, thereby ensuring greater safety in operation. Particularly is this the case where the operator may desire to effect a braking action of the engine upon the car when coasting down a long hill. If the motor vehicle has reached a relatively high speed under the above mentioned conditions it is usually impossible, with the present change speed gearing, to change from high into low, and accidents have occurred when the brakes suddenly failed to work. The use of the device embodying my invention permits of changing from high to second speed at vehicle speeds as high as forty to fifty miles per hour, and permits of changing from second to low speed at vehicle speeds as high as twenty to thirty miles per hour. This permits an operator to change from high speed to second speed or even to low speed when coasting down a hill, and if the ignition system of the engine is then de-energized, the car will be under control of the operator even though the usual brakes might not be fully operative.

Various modifications may be made in the device embodying my invention without departing from the spirit and scope thereof, and I desire that only such limitations shall be placed thereon as are imposed by the prior art.

I claim as my invention:—

In a power transmitting device for motor vehicles, the combination with a two-part multiple-jaw clutch having beveled jaw faces, of a two-part resilient means for controlling said clutch and comprising a relatively heavy resilient member operative in the disengagement of said clutch, and a relatively light resilient member operative in the re-engagement of said clutch.

In testimony whereof I affix my signature.

JOHN A. STUMPENHORST.